US012390826B2

(12) United States Patent
Wiener

(10) Patent No.: US 12,390,826 B2
(45) Date of Patent: *Aug. 19, 2025

(54) PAINT APPLICATOR, KIT AND METHOD

(71) Applicant: DESIGNING SOLUTIONS, LLC, Chestertown, MD (US)

(72) Inventor: Deborah Wiener, Chestertown, MD (US)

(73) Assignee: DESIGNING SOLUTIONS, LLC, Chestertown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/808,499

(22) Filed: Aug. 19, 2024

(65) Prior Publication Data

US 2024/0408636 A1 Dec. 12, 2024

Related U.S. Application Data

(63) Continuation of application No. 17/881,928, filed on Aug. 5, 2022, now Pat. No. 12,064,784, which is a (Continued)

(51) Int. Cl.
*A46B 11/04* (2006.01)
*A46B 11/00* (2006.01)
(Continued)

(52) U.S. Cl.
CPC ............ *B05C 1/00* (2013.01); *A46B 11/0024* (2013.01); *A46B 11/0027* (2013.01); *A46B 11/0034* (2013.01); *B05C 17/003* (2013.01); *B05C 17/025* (2013.01); *B05C 17/0308* (2013.01); *B05C 17/0333* (2013.01); *B05D 1/28* (2013.01); *A46B 11/0062* (2013.01); *A46B 11/0065* (2013.01); *A46B 2200/202* (2013.01)

(58) Field of Classification Search
CPC ........... B05C 1/00; B05C 17/003; B05D 1/28; A46B 2200/202
See application file for complete search history.

(56) References Cited

U.S. PATENT DOCUMENTS

| | | | |
|---|---|---|---|
| 1,085,234 | A | 1/1914 | Allan |
| 1,337,998 | A | 4/1920 | Church |

(Continued)

FOREIGN PATENT DOCUMENTS

| | | | | |
|---|---|---|---|---|
| GB | 2353698 A | * 3/2001 | | A46B 11/0024 |

*Primary Examiner* — Jennifer C Chiang
(74) *Attorney, Agent, or Firm* — CALDERON SAFRAN & WRIGHT P.C.

(57) ABSTRACT

A paint applicator, kit and methodology for using the same is disclosed. For example, paint applicator that allows a user to load a desired amount of paint, such as a water based other low VOC paint, into the paint applicator and an advancement mechanism that dispenses paint at a rate controllable by the user is disclosed. The advancement mechanism can include system that translates a rotational force applied to an end cap of the applicator into a linear that advances a piston which in turn applies paint to an applicator portion. The paint may be reusable or may include a ratchet system that allows for only one time use. methodology and kit can incorporate a syringe for loading paint into the paint applicator, reducing the loss of paint through spilling.

20 Claims, 7 Drawing Sheets

Related U.S. Application Data continuation of application No. 17/177,023, filed on Feb. 16, 2021, now Pat. No. 11,413,644, which is a continuation of application No. 16/413,154, filed on May 15, 2019, now Pat. No. 10,919,069, which is a continuation of application No. 15/695,353, filed on Sep. 5, 2017, now Pat. No. 10,293,360, which is a continuation of application No. 13/733,823, filed on Jan. 3, 2013, now abandoned.

(60) Provisional application No. 61/582,746, filed on Jan. 3, 2012.

(51) Int. Cl.

| | |
|---|---|
| ***B05C 1/00*** | (2006.01) |
| ***B05C 17/00*** | (2006.01) |
| ***B05C 17/025*** | (2006.01) |
| ***B05C 17/03*** | (2006.01) |
| ***B05D 1/28*** | (2006.01) |

(56) References Cited

U.S. PATENT DOCUMENTS

| | | | |
|---|---|---|---|
| 1,393,841 | A | 10/1921 | Simmons |
| 1,417,642 | A | 5/1922 | Tallman |
| 1,548,259 | A | 8/1925 | Erikson |
| 2,121,239 | A | 6/1938 | Ashley |
| 2,264,564 | A | 12/1941 | Connor |
| 2,328,048 | A | 8/1943 | Bair |
| 2,554,287 | A | 5/1951 | Wilson |
| 4,624,594 | A | 11/1986 | Sasaki et al. |
| 4,732,503 | A | 3/1988 | Bader et al. |
| 4,875,791 | A | 10/1989 | Hassan |
| 4,997,371 | A | 3/1991 | Fischer |
| 5,123,766 | A | 6/1992 | Babiak |
| 5,242,234 | A | 9/1993 | Ahrens |
| 5,496,123 | A | 3/1996 | Gaither |
| 5,636,931 | A | 6/1997 | Gueret |
| 5,697,918 | A | 12/1997 | Fischer et al. |
| 5,803,640 | A | 9/1998 | Nakajima et al. |
| 5,890,829 | A | 4/1999 | Hesse |
| 6,161,978 | A | 12/2000 | Dovellos |
| 6,227,739 | B1 | 5/2001 | Kageyama |
| 6,283,660 | B1 | 9/2001 | Furlong et al. |
| 6,435,751 | B1 | 8/2002 | Ono et al. |
| 6,474,891 | B1 | 11/2002 | Liu |
| 6,488,429 | B2 | 12/2002 | Korper |
| 6,726,389 | B1 | 4/2004 | Lee |
| 6,752,558 | B1 | 6/2004 | Hsu |
| 6,793,431 | B1 | 9/2004 | Tsai |
| 6,974,092 | B1 | 12/2005 | Leventhal |
| 7,182,538 | B2 | 2/2007 | Grosso et al. |
| 7,338,225 | B1 | 3/2008 | Taylor |
| 7,556,447 | B2 | 7/2009 | Bruggeman et al. |
| 7,682,098 | B2 | 3/2010 | Sandahl et al. |
| 7,854,562 | B2 | 12/2010 | Peterson et al. |
| 8,092,108 | B2 | 1/2012 | Bainbridge et al. |
| 8,152,399 | B2 | 4/2012 | Lasfargues et al. |
| 8,328,449 | B2 | 12/2012 | Wightman et al. |
| 8,740,489 | B2 | 6/2014 | Kageyama et al. |
| 8,845,221 | B2 | 9/2014 | Fukumoto |
| 8,905,666 | B2 | 12/2014 | Ooba |
| 9,161,604 | B2 | 10/2015 | Nakamura et al. |
| 10,919,069 | B2 | 2/2021 | Wiener |
| 12,064,784 | B2 | 8/2024 | Wiener |
| 2002/0127045 | A1 | 9/2002 | Cookfair et al. |
| 2005/0063766 | A1 | 3/2005 | Chen et al. |
| 2005/0072442 | A1 | 4/2005 | Licari et al. |
| 2005/0141949 | A1 | 6/2005 | Calabro |
| 2006/0243824 | A1 | 11/2006 | Juo |
| 2007/0248402 | A1 | 10/2007 | Chan |
| 2007/0280776 | A1 | 12/2007 | Castellana |
| 2008/0075525 | A1 | 3/2008 | Lewis |
| 2009/0052971 | A1 | 2/2009 | Pires et al. |
| 2009/0297253 | A1 | 12/2009 | Yuu |
| 2013/0114990 | A1 | 5/2013 | Sandahl et al. |
| 2013/0171362 | A1 | 7/2013 | Wiener |
| 2015/0016860 | A1 | 1/2015 | Pierre |
| 2017/0217244 | A1 | 8/2017 | Fehlmann et al. |
| 2021/0237112 | A1 | 8/2021 | Wiener |

* cited by examiner

PAINT APPLICATOR, KIT AND METHOD

CROSS-REFERENCE TO RELATED APPLICATIONS AND CLAIM TO PRIORITY

This application is a continuation of U.S. application Ser. No. 17/881,928, filed Aug. 5, 2022, now U.S. Pat. No. 12,064,784, which is a continuation of U.S. application Ser. No. 17/177,023, filed Feb. 16, 2021, now U.S. Pat. No. 11,413,644, which is a continuation of U.S. application Ser. No. 16/413,154, filed May 15, 2019, now U.S. Pat. No. 10,919,069, which is a continuation of U.S. application Ser. No. 15/695,353, filed Sep. 5, 2017, now U.S. Pat. No. 10,293,360, which is a continuation of U.S. application Ser. No. 13/733,823 filed Jan. 3, 2013, which claims priority to Provisional Application No. 61/582,746 filed Jan. 3, 2012, the disclosures of which are incorporated herein by reference and to which priority is claimed.

BACKGROUND

Technical Field

The presently disclosed subject matter relates to a fillable instrument that paint through a tip onto a surface in order to repair blemishes, and more particularly, to instrument for dispensing paint that includes an advancement mechanism for supplying paint at rate that can be controlled by the user, and a related method and kit for using

Related Art

Conventional approaches to applying paint typically involve the use of an such as a paint brush or paint roller, and a container where the paint is stored. This approach be efficient for larger painting projects where there is an expectation that all of the paint will used. However, touch-up and finishing projects typically require a smaller amount of paint and are often done sometime after the original paint job was completed. In these cases, a user typically need to find the original paint container and use a painting instrument to make desired touch-ups. This approach often results in spilled paint as the user moves the container to each location requiring a touch-up. In many cases, more paint is spilled or lost is actually needed for the touch-up In view of the foregoing drawbacks, it would be desirable to have a system methodology that provides a user with a portable and easily maneuverable paint applicator minimizes the risk of spills and lost paint.

SUMMARY OF THE DISCLOSED EMBODIMENTS

The disclosed embodiments provide a fillable and adjustable paint applicator capable interchangeably receiving a variety of different paints and a variety of paint According to one embodiment, the paint applicator includes a cylindrical, pen-shaped capable of holding a paint, an applicator structure for dispensing the paint onto a surface and advancement mechanism for forcing the paint into the applicator. The applicator structure be one of a variety of applicators, such as paint brushes having a variety of shapes or a sponge other mechanisms for applying paint. The applicator structure can be coupled to the pen-body of the paint applicator through a variety of mechanisms. Thus, the disclosed provide for a removable and replaceable applicator allowing the user to apply paint through variety of techniques.

The disclosed embodiments also provide for a cylindrical shaped pen-shaped which is capable of receiving and storing paints. Paint can be loaded in an interior volume of the pen-shaped body by removing a cap which allows the paint to be poured or otherwise injected placed into the pen-shaped body. In an alternate embodiment, the pen-shaped body is capable receiving a pre-loaded paint cartridge which can be inserted and fitted into the pen-shaped obviating the need to pour the paint directly into the pen-shaped body. The disclosed applicator also includes an end cap. The end cap covers the non-applicator end of the device can be removed in order to add paint to the pen-shaped body. In one embodiment, the end also engages an advancement mechanism which pushes the paint toward the applicator. advancement mechanism may include a piston mechanism which moves in a linear direction response to the rotation of the end cap. Thus, the paint can be forced through the toward a tip through the twisting motion of the end cap. The disclosed embodiments include a cover which can be snapped on to the applicator in order to prevent drying of applicator tip.

The disclosed embodiments also provide a paint applicator, including a cylindrical body having a first end and a second end, the cylindrical main body defining an interior configured to receive a paint, an applicator structure disposed at the first end of the main body, the applicator structure in fluid communication with the interior volume of cylindrical main body, the applicator structure including a tip for applying the paint to a an advancement mechanism for advancing the paint from the interior volume to the structure, the advancement mechanism including an advancement arm and a piston with piston rod, the advancement arm including threads for engaging the threaded piston rod and end cap disposed adjacent the second end of the cylindrical main body, the end cap engaged an end of the advancement arm.

The disclosed embodiments also provide a paint applicator kit, including an including a cylindrical main body having a first end and a second end, the cylindrical main defining an interior volume configured to receive a paint, an applicator structure disposed at first end of the cylindrical main body, the applicator structure in fluid communication with the interior volume of the cylindrical main body, the applicator structure including a tip for the paint to a surface, an advancement mechanism for advancing the paint from the volume to the applicator structure, the advancement mechanism including a base and a with piston rod, the base including threads engaging the piston rod, an end cap disposed the second end of the cylindrical main body, the end cap engaged to an end of the advancement mechanism and a paint transfer structure configured to transfer paint from a paint reservoir to interior volume of the main body of the applicator structure.

The disclosed embodiments further provide a method for use of a paint including providing an applicator including a cylindrical main body having a first end and second end, the cylindrical main body defining an interior volume configured to receive a an applicator structure configured to be disposed at the first end of the cylindrical main body, applicator structure including a tip for applying the paint to a surface, an mechanism configured to advance the paint from the interior volume to the applicator the advancement mechanism including a piston with piston rod, providing a paint structure configured to transfer paint from a paint reservoir to the interior volume of the body of the applicator, transferring paint from the paint reservoir to the paint transfer transferring paint from the paint transfer structure to the interior volume of the main body of applicator via the first end of the main body, placing the applicator structure in the first end of the main body such that the paint is in fluid communication with both the applicator and the interior volume of the main body and actuating the advancement mechanism such that the piston and piston rod move within the interior volume of the main body and cause paint the interior volume to move to the applicator

BRIEF DESCRIPTION OF THE DRAWINGS

These and other characteristics of the presently disclosed subject matter will clear from the following description with reference to the accompanying drawings.

DETAILED DESCRIPTION OF THE EXEMPLARY EMBODIMENTS

Figure 1:
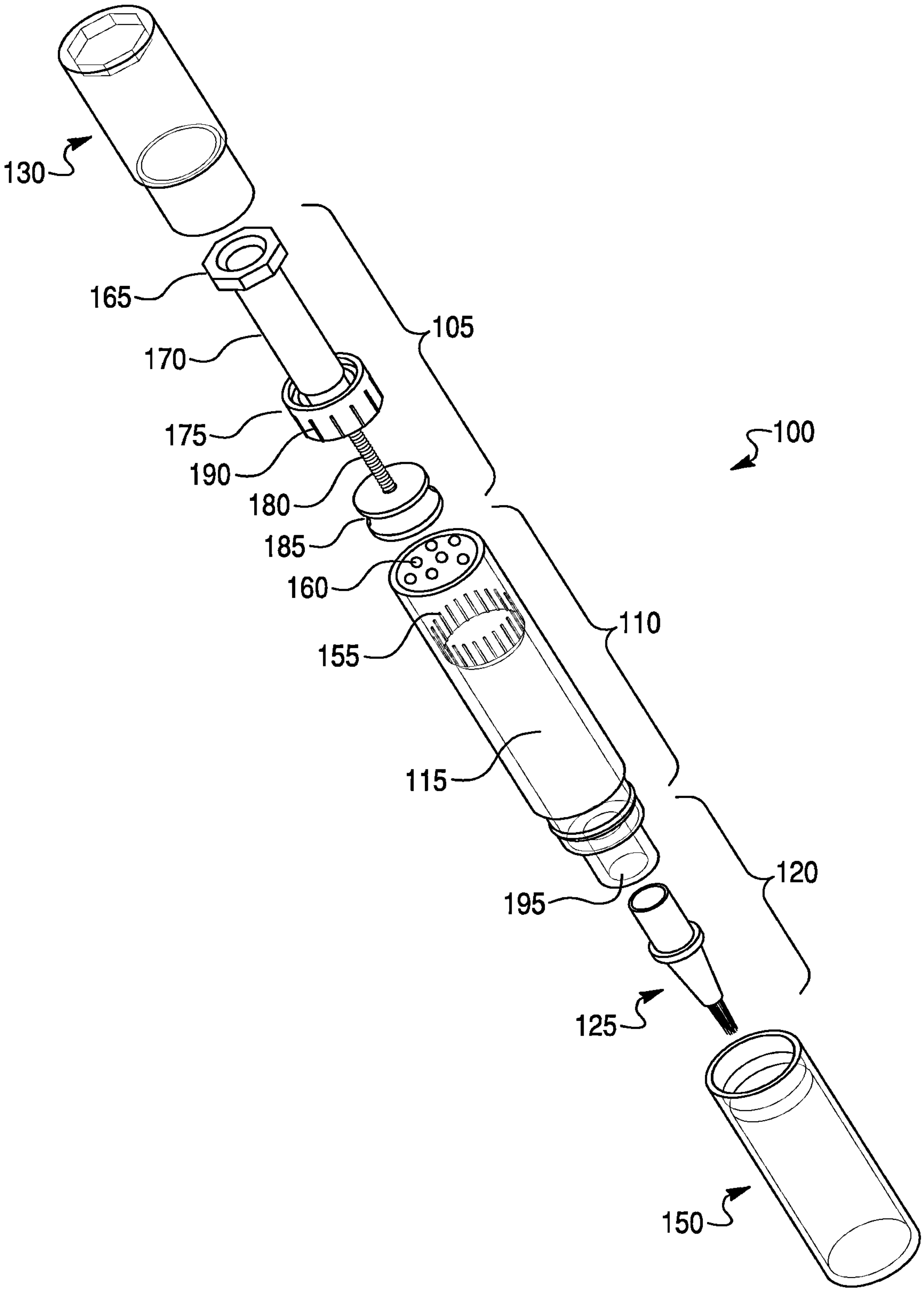
FIG. 1 is an exploded view of an embodiment of a paint applicator made in with principles of the disclosed subject matter.

The presently disclosed subject matter will be described in detail hereinafter reference to exemplary embodiments shown in the accompanying FIG. 1 is an exploded view of an embodiment of a paint applicator 100 made accordance with principles of the disclosed subject matter. FIG. 1 shows that the paint applicator 100 includes a main body 110 which is cylindrical and/or pen-shaped. An applicator portion for applying paint is disposed at a first or forward end of the main body 110. A cover 150 be provided to cover the applicator 120 before and after the use of the paint applicator 100. end cap 130 is fitted onto a second or aft end of the main body 130. As will be described in greater detail below, the end cap 130 may be communicatively coupled to an mechanism 105.

According to the embodiment of FIG. 1, the main body 110 is cylindrical and shaped and includes an interior volume 115 capable of receiving and holding paint. The applicator portion 120 is in fluid communication with the interior volume 115 of the main body 110 so that the applicator portion 120 can receive paint stored in the interior volume 115 to dispensed onto a surface or substrate. In another embodiment, the main body 110 is capable receiving a pre-filled paint cartridge which can be fitted into the interior volume 115 of the body 110. For example, the paint can be advanced through the interior volume 115 by advancement mechanism 105 which is described in greater detail The main body 110 can be formed from a clear plastic so that the user can see the and level of the paint. In one embodiment, small ball bearings 160 can be optionally added the interior volume 115 to assist with mixing of the paint. An interior surface of the main body 110 can also be equipped with ridges 155 which are formed in a circular pattern on the surface. As will be discussed in greater detail below, the ridges 155 assist with maintaining position of the advancement mechanism 105 within the interior volume 115 of the main body 110.

As described above, FIG. 1 also shows the applicator portion 120 which is fitted onto first end of the main body 110. In some embodiments, the interior volume 115 of the main 110 can be filled with paint when the applicator portion 120 is disconnected from the main 110. Then, the applicator portion 120 can be fitted onto the main body 110 through a variety mechanisms. For example, it can be snap fitted onto the main body 110 or it can be onto the main body 110 when the applicator portion 120 and the main body 110 are each with one of threads or notches for receiving the threads. The applicator portion 120 is capable receiving paint delivered from the interior volume 115 of the main body 110. The portion 120 can then be used to apply paint onto a surface or substrate. The applicator 120 can also include a tip 125 which absorbs paint delivered through the interior volume 115 the main body 110 and which is used to apply paint to a surface. An opening 195 can be at an end of the main body 110 for receiving paint and can be closed by attachment of the tip 125. The tip 125 can include a variety of different mechanisms for applying paint. For in FIG. 1, the tip 125 is shown as a paint brush. However, the disclosed subject contemplates that the tip can be any type of mechanism suitable for applying paint, such as sponge, wick, paper product, etc.

FIG. 1 also shows the end cap 130 which is disposed at the far end of the main 110. In some embodiments, the end cap 130 is fixed to the main body 110 so that it cannot removed. In other embodiments, the end cap 130 can be removed in order to expose the volume 115 of the main body 110. In these embodiments, when the end cap 130 is removed, interior volume 115 can be filled with a paint selected by the user. Alternately, when the end 130 is removed, a pre-filled paint cartridge holding paint can be inserted into the interior 115 of the main body 110. In this embodiment, once the interior volume 115 of the main 110 is filled with paint, the end cap 130 can be placed back onto the end of the main body 110 that the interior volume 115 is sealed.

As will be described in greater detail below, the end cap 130 can also be used to the advancement mechanism 105 which forces the paint toward the applicator portion 120 ensure that the applicator is wetted with enough paint so that it can be smoothly applied to surface. Thus, rotation of the end cap 130 engages the advancement mechanism 105 in such manner that the rotational force applied to the end cap 130 is translated to a linear force to a piston which pushes the paint toward the applicator portion FIG. 1 also shows the advancement mechanism 105 which includes an head 165, and an advancement arm 170. The advancement mechanism also includes a base a stem 180 and a piston head or plunger 185. The advancement head 165 of the mechanism 105 can be fitted into a tip end of the end cap 130, so that rotation of the end cap causes rotation of the advancement head 165 and the advancement arm 170. The piston 185 faces and contacts the paint. An outer edge or rim of the piston 185 makes contact with inner surface of the interior volume 115 of the main body 110 when the advancement 105 is placed into the interior volume 115. The piston 185 is advanced or retracted by interaction between the advancement arm 170 and the stem 180 which each have mating The base 175 also includes notches 190 which are formed along an outer edge of the base The notches 190 can mate with the ridges 155 formed on the interior surface of the main 110 so that the advancement mechanism is fixed into the interior volume 115. As shown in FIG. 1, the advancement arm 170 extends from a bottom surface of the advancement head 165. advancement arm 170 has interior threads (not shown in FIG. 1) that can engage the formed on the stem 180. Thus, the advancement head 165 can be fitted into the end cap 130 that a rotational force applied to the end cap 130 also causes rotation of the advancement 165. This rotational force also causes the advancement arm 170 to rotate so that the threads of the advancement arm 170 engage the threads of the stem 180 so that the piston 185 moves in a linear direction away from the end cap 130. In this manner, the piston 185 advanced through the interior volume 115 toward the tip 125 so that paint that occupies interior volume 115 is forced onto the tip 125. Thus, in use, a user can rotate the end cap 130 apply more paint to the tip 125 as it dries or needs replenishment. In this manner, a user apply paint without the risk of spilling or wasting paint.

Figure 2:
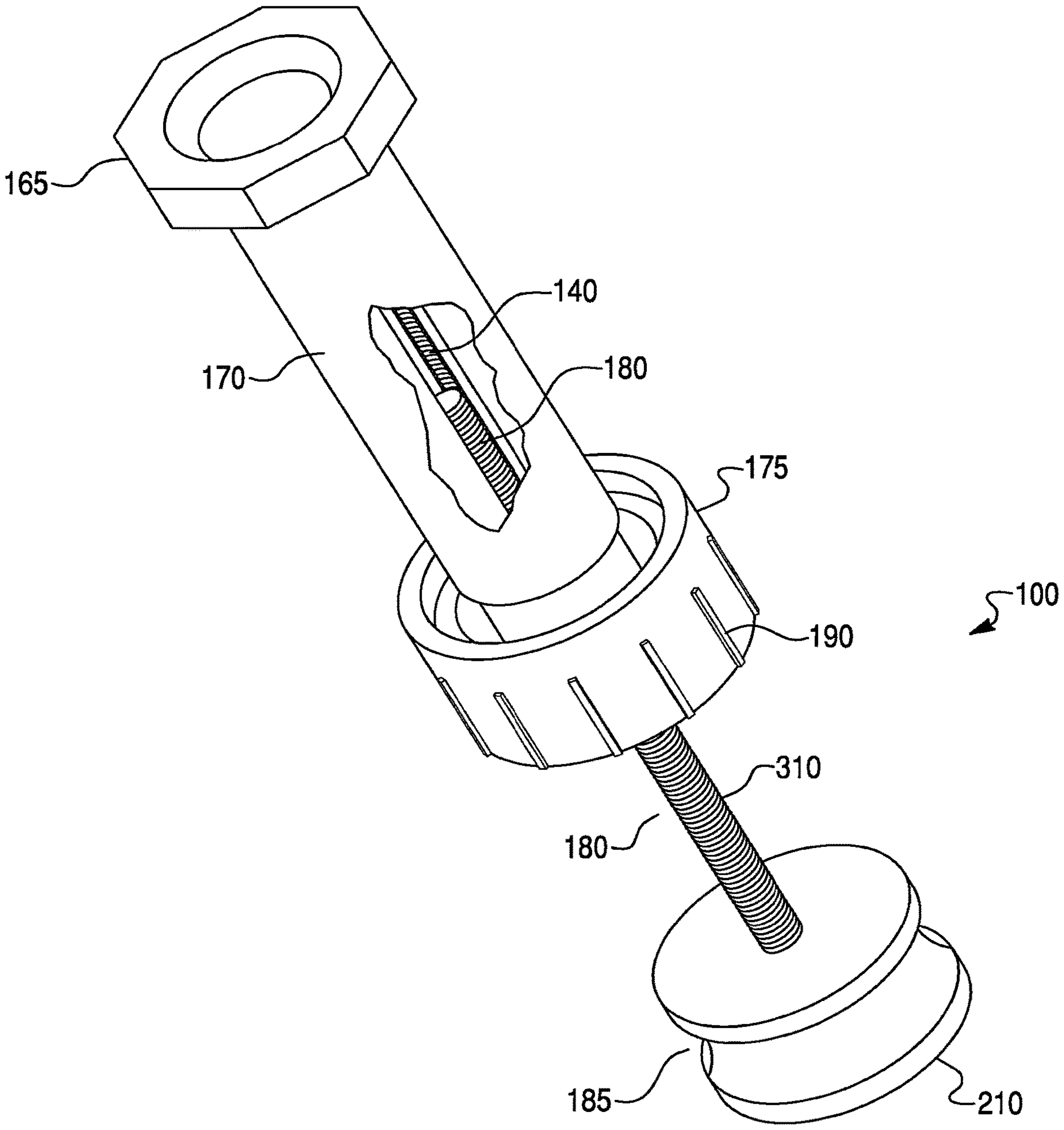
FIG. 2 is a perspective cut-away view of an advancement mechanism in accordance an embodiment of the disclosed subject matter.

The advancement mechanism 105 is configured so that the piston 185 can be and the interior volume 115 can be cleaned and refilled allowing for multiple uses. In alternate embodiment discussed below with reference to FIG. 4, the piston can only be moved a direction towards the tip and cannot be retracted. In this embodiment, the paint applicator is single use/disposable device which cannot be reused. Thus, once the user has used all of paint contained in the interior volume, the paint applicator can then be disposed FIG. 2 shows a perspective view of the applicator 100 of FIG. 1. FIG. 2 shows advancement head 165 and the advancement arm 170 in communication with the base 175. As discussed above, both the advancement head 165 and the advancement arm 170 rotate when end cap 130 (shown on FIG. 1) is rotated. FIG. 2 also shows that a base 175 is provided the stem 180 and the plunger 185. The base 175 has notches 190 formed in a circular around its outer periphery. The notches 190 mate with the ridges 155 formed on the surface of the interior volume 115 so that the base does not rotate when the advancement head 165 and advancement arm 170 are rotated. The base also includes a keyhole structure shown) through which the stem 180 is positioned so that it mates with interior threads formed in the inner surface of the advancement arm 170 (see FIG. 3). In this manner, rotation the advancement head 165 causes rotation of the advancement arm 170 which causes the 140 to engage threads 310 of the stem to produce linear movement of the stem 180. In embodiment of FIGS. 1-3, the stem 180 and plunger 185 can be extended or retracted upon the rotational direction of the advancement head 165 and the advancement arm 170. FIG. also shows an outer edge 210 of the piston head 185 that contacts the inner surface of the body 110 to ensure that all or most of the paint loaded into the inner volume 115 is advanced.

Figure 3:
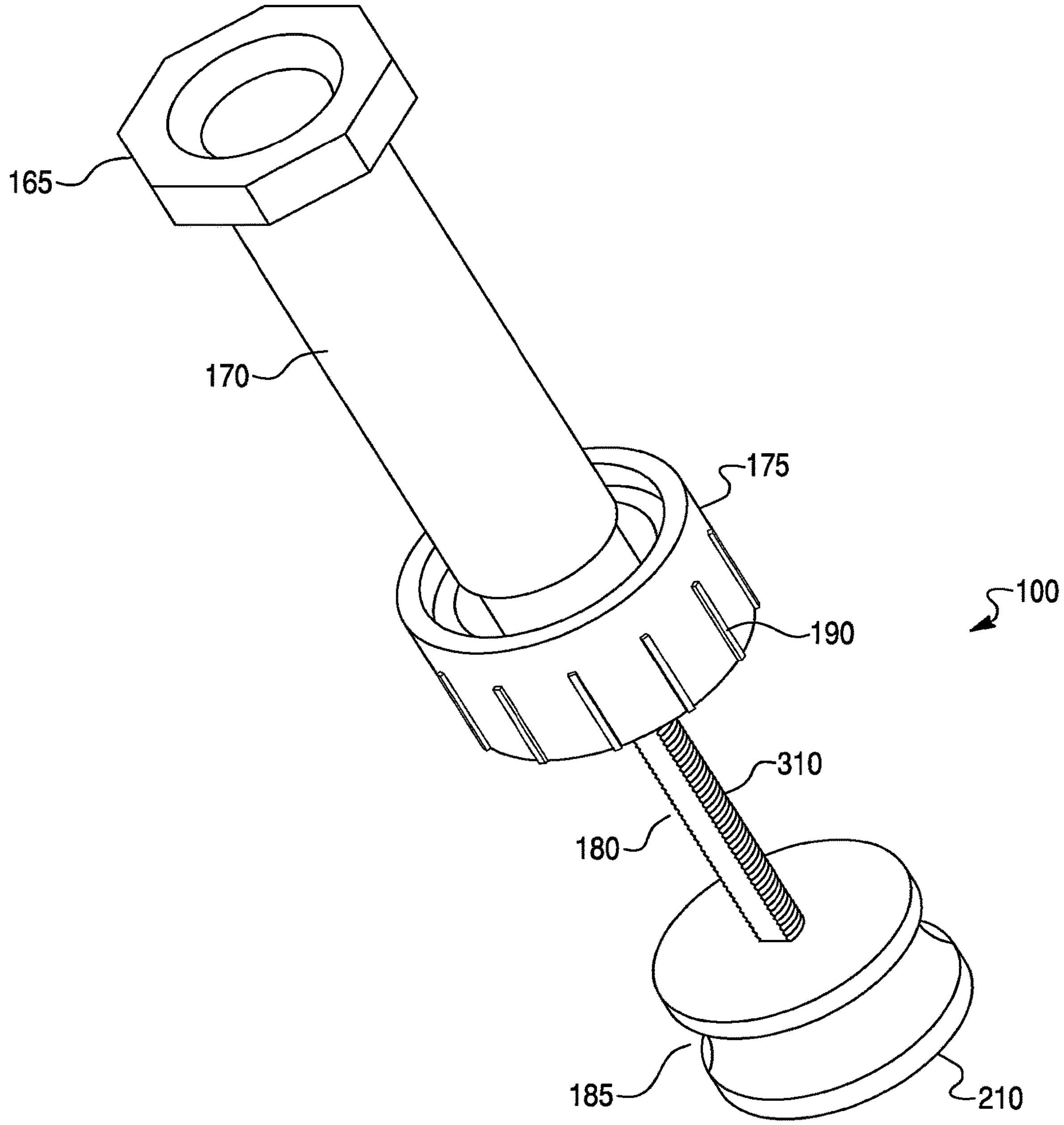
FIG. 3 is a perspective view of the advancement mechanism according to embodiment of the disclosed subject matter.

FIG. 3 shows a perspective view of an applicator 100 with some minor In FIG. 3, the stem 180 has a substantially rectangular cross-sectional shape with rounded so that threads 310 are only formed along the rounded edges and there are two opposed surfaces between the screw threads. These two flat surfaces are configured to act in with a mating rectangular keyway located on the interior surface on the central axis of the 175. It is noted that the advancement arm 170 is rotatable with respect to the base 175 (and therefore with respect to stem 180 and main body 110). The mating keyway surface of the 175 prevents the stem 180 from rotating with respect to the base 175 and therefore also rotation with respect main cylinder body 115. Thus, rotary movement of the end cap 130 reliably transferred to linear movement of the piston 185 and stem The paint applicator 100 according to the disclosed embodiments provides a device allowing users to fix paint blemishes without requiring the purchase of a large volume paint. Instead, paint vendors can sell the paint applicators prefilled with a color requested by consumer. The consumer can then purchase paint applicators 100 prefilled with the type paints desired by the consumer and use them when needed. The paint applicator 100 can be weight and maneuverable so that a user does not require any specialized skill in order to paint for touch-up applications. In particular, the paint applicator 100 can be made from transparent or clear polymers (except possibly for the tip 125 itself). The configuration the applicator 100 also allows the user to accurately and precisely apply touch up paint to an without over painting or without damaging the surface being painted. The paint applicator will typically be filled with a water based, acrylic, latex and/or otherwise low VOC paint has good flow properties and which will not easily dry and clog the A user seeking to use the paint applicator 100 will first seek to load the interior 115 with paint. The paint applicator 100 may be configured with the applicator portion already attached to the main body 110, or, alternately, with the applicator portion disconnected from the main body 110. For packaging purposes, the applicator portion 120 be nested to the interior volume 115 to reduce the size of the applicator 100. In this case, user can remove the applicator portion 120 and attach it to the main body 110. In embodiments, the applicator portion 120 can be snap fitted onto the end of the main body In other embodiments, the applicator portion 120 and the end of the main body 110 can equipped with threads that allow the applicator portion 120 to be screwed into the main 110. It is also contemplated that multiple applicator portions 120 can be provided with device so that a user can quickly change out a dry applicator and/or can quickly change color paint being used by the device. In one embodiment, the user can fill the interior volume with paint when the applicator portion 120 is removed from the main body 110. In order minimize spills, the user can remove paint from a paint container using a syringe or other transfer structure and then deposit the paint from the syringe into the interior volume of applicator 100. In another embodiment, the paint can be deposited from the other end of applicator 100 by removing the end cap In another embodiment, a paint cartridge can be loaded into the interior volume 115 the paint applicator. Pre-loaded paint cartridges have the added advantage that the user does have to handle paint. The paint cartridge can be in many various forms, including a plastic bag that is punctured after insertion into the interior volume 115. Alternatively, plastic cylinders pre-filled with paint could be sold that fit within the interior volume 115 and only disperse paint when a force is applied to one or both ends of the plastic Once the interior volume 115 is loaded with paint, the user can rotate the end cap into order to wet the tip 125. Rotating the end cap 130 cause the end cap 130 to engage rotate the advancement head 165. Rotation of the advancement head 165 also causes rotation of the advancement arm 170 which in turn causes the linear advancement of the stem 180 in direction toward the tip 125. As the stem 180 advances, the piston 185 also advances the paint in the direction of the tip 125. The user can continue to turn the end cap 130 until tip 125 has enough paint for the desired use. When the user determines that the tip requires paint, he or she can advance the paint by turning the end cap 130. As described above, the 175 generally holds the advancement mechanism 105 in place through the engagement of notches 190 with the ridges 155.

Once the user has completed the project, the user can either dispose of the 100 or can retract the piston 185 by turning the end cap 130 in a direction opposite to direction turned for advancing the piston. The user can then clean out the inner volume 115 reuse the applicator as needed.

Figure 4:
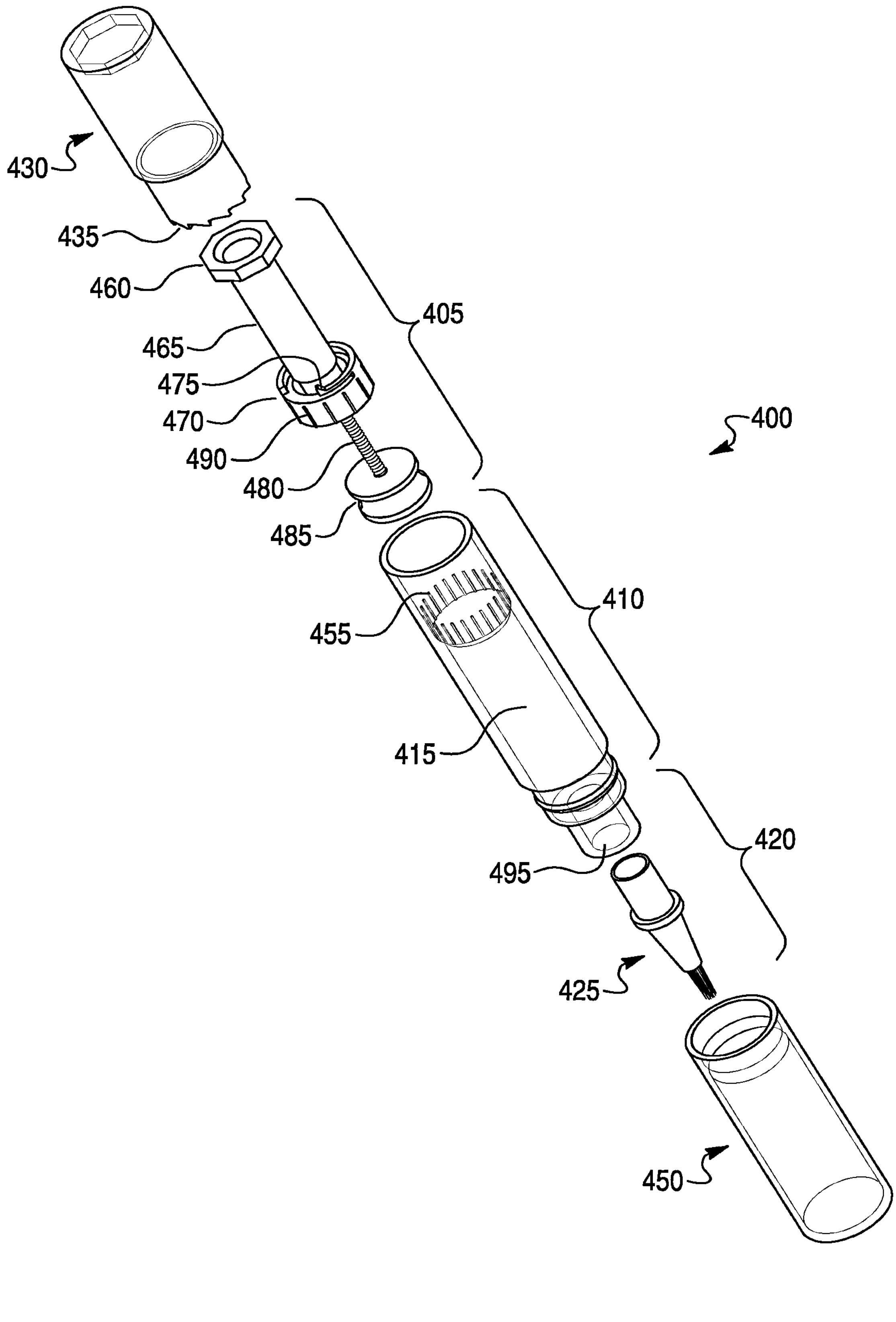
FIG. 4 is an exploded view of another embodiment of the paint applicator in with principles of the disclosed subject matter.

FIG. 4 is an exploded view of another embodiment of a paint applicator 400 in which advancement mechanism cannot be retracted once the piston is advanced. Thus, the of FIG. 4 can be considered a single use device. FIG. 4 shows a paint applicator 400 that a main body 410 which is cylindrical and/or pen-shaped. An applicator portion 420 for paint is disposed at a first or forward end of the main body 410. A cover 450 may be provided cover the applicator portion 420 before and after use of the paint applicator 400. An end cap is fitted onto a second or aft end of the main body 410. The end cap 430 includes a plurality engagement teeth 435 which engage an advancement mechanism 405 as described in detail below.

According to the embodiment of FIG. 4, the main body 410 is cylindrical and shaped and includes an interior volume 415 capable of receiving and holding paint. The applicator portion 420 is in fluid communication with the interior volume 415 of the main body 410 so that the applicator portion 420 receives paint to be dispensed onto a surface. In embodiment, the main body 410 is capable of receiving a pre-filled paint cartridge which can be fitted into the interior volume 415 of the main body 410. In either of these embodiments, paint can be advanced through the interior volume 415 by an advancement mechanism which is described in greater detail below.

As with the embodiment of FIG. 1, the main body 410 can be formed from a plastic so that the user can see the color and level of the paint. In one embodiment, small bearings (not shown in FIG. 4) can be optionally added into the interior volume 415 to assist mixing of the paint. An interior surface of the main body 410 can also be equipped with ridges 455 which are formed in a circular pattern on the interior surface. As will be discussed in detail below, the ridges assist with maintaining the position of the advancement mechanism within the interior volume of the main body In one embodiment, the applicator portion 420 can be removably fitted onto a first of the main body 410. In these embodiments, the interior volume 415 of the main body 410 be filled with paint when the applicator portion 420 is disconnected from the main body Then, the applicator portion 420 can be fitted onto the main body 410 through a variety mechanisms. For example, it can be snap fitted onto the main body 410 or it can be onto the main body 410 if the applicator portion 420 and the main body are each fitted with of threads or notches for receiving the threads. The applicator portion 420 is capable receiving paint delivered from the interior volume 415 of the main body 410. The portion 420 can then be used to apply paint onto a surface or substrate. The applicator 420 can also include a tip 425 which absorbs paint delivered through the interior volume 415 the main body 410 and is used to apply paint to a surface. An opening 495 can be formed at end of the main body 410 for receiving paint and can be closed by attachment of the tip 425. The tip 425 can include a variety of different mechanisms for applying paint. For example, FIG. 4, the tip 425 is shown as a paint brush. However, the disclosed embodiments that the tip can be any type of mechanism suitable for applying paint, such as a sponge, paper product, etc.

FIG. 4 also shows the end cap 430 which is disposed at the far end of the main 410. In some embodiments, the end cap 430 is fixed to the main body 410 so that it cannot removed. In other embodiments, the end cap 430 can be removed in order to expose the volume 415 of the main body 410. In these embodiments, when the end cap 430 is removed, interior volume 415 can be filled with a paint selected by the user. Alternately, when the end 430 is removed, a pre-filled paint cartridge holding paint can be inserted into the interior 415 of the main body 410. For example, once the interior volume 415 of the main body 410 is filled with paint, the end cap 430 can be placed back onto the end of the main body 410 so the interior volume 415 is sealed.

The end cap 430 can also be used to drive the advancement mechanism 405 forces the paint toward the applicator portion 420 to ensure that the tip 425 is wetted enough paint so that it can be applied to a surface. The end cap 430 can be rotated so as to engage the advancement mechanism 405 in such a manner that the rotational force applied to end cap 430 is translated to a linear force applied to a piston which pushes the paint toward applicator portion 420. The end cap can be securely fitted onto the end of the main body 410 as to engage a portion of the advancement mechanism FIG. 4 also shows the advancement mechanism 405 which includes a ratchet head and a ratchet arm 465. The advancement mechanism 405 also includes a base 470, a stem and a piston head or plunger 485. The ratchet head 460 of the advancement mechanism 405 be fitted into the end cap 430, so that rotation of the end cap 430 cause rotation of the head 460 and the ratchet arm 465. The piston head 485 faces and contacts the paint. An edge or rim of the piston 485 makes contact with the inner surface of the interior volume 415 the main body 410 when the advancement mechanism 405 is placed into the interior volume The piston 485 is advanced or retracted by action of the ratchet arm 465 which contacts the 480 and which each have mating threads. The base 470 includes notches 490 which are along an outer edge of the base 470. The notches 190 can mate with the ridges 455 formed the interior surface of the main body 410 so that the advancement mechanism 405 is fixed into the interior volume 415. As shown in FIG. 4, the ratchet arm 465 extends from a bottom of the ratchet head 460. The ratchet arm 465 has interior threads (not shown in FIG. 4 but to threads 140 of FIG. 2) that can engage the threads formed on the stem 480. Thus, the head 460 can be fitted into the end cap 430 so that a rotational force applied to the end cap also causes rotation of the ratchet head 460. This rotational force also causes the ratchet arm to rotate so that the interior threads of the ratchet arm 465 engage the threads of the stem 480 that both the stem 480 and the piston head 485 move in a linear direction away from the end 430. In this manner, the piston 485 is advanced through the interior volume 415 toward the 425 so that paint that occupies the interior volume 415 is forced onto the tip 425. Thus, in use, user can rotate the end cap 430 to apply more paint to the tip 425 as it dries or replenishment. In this manner, a user can apply paint without the risk of spilling or paint.

Figure 5:
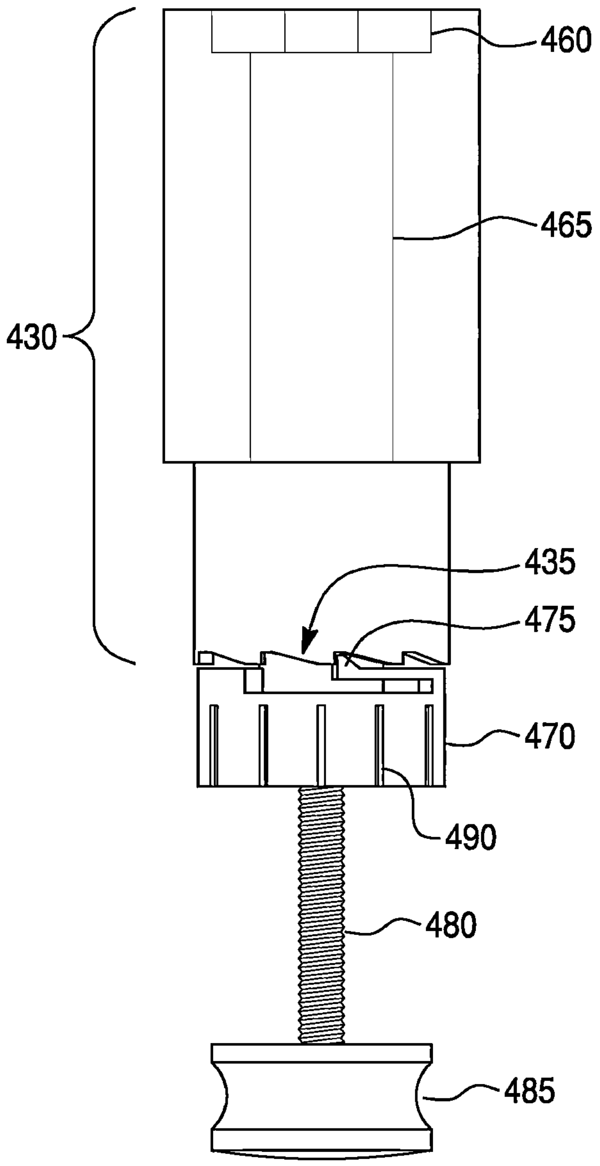
FIG. 5 is a plan view of the advancement mechanism of the embodiment of FIG.
Figure 6:
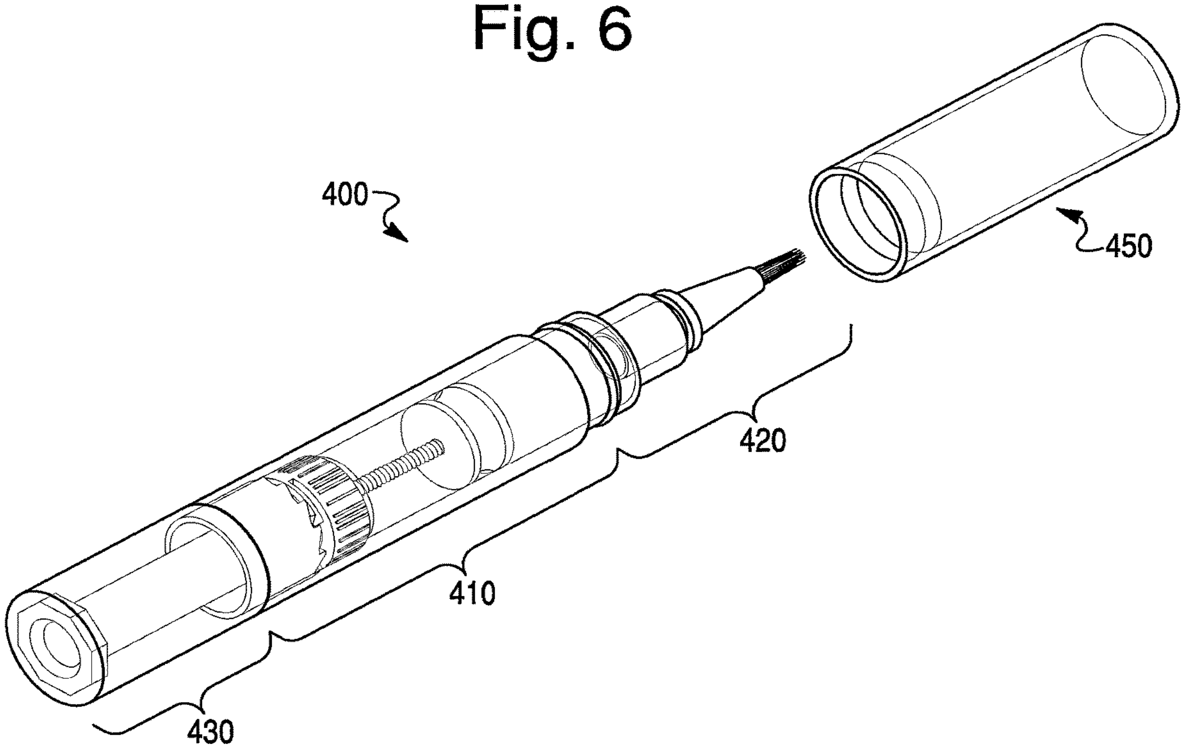
FIG. 6 is a perspective view of the paint applicator of FIG.

The advancement mechanism 405 is configured so that the piston 485 cannot retracted and can only move in a direction of the tip 425. Thus, in this embodiment, the applicator 400 is a single use/disposable device which cannot be reused. Thus, once the user used all of the paint contained in the interior volume 415, the paint applicator 400 can then disposed of. As shown in FIG. 4, the end cap 430 includes ratchet teeth 435 formed along circumference of the lower end of the end cap 430. The base 470 also includes at least ratchet arm 475 formed along a top surface of the base 470. The combination of the ratchet 435 and ratchet arms 475 forms a system in which the end cap 430 and the ratchet arm 465 allowed to rotate in a first direction (e.g., clockwise as shown in FIG. 4) and are prevented rotating in an opposite direction. Thus, this structure provides for incremental advancement the piston in only one direction, e.g., the direction of the tip 425. The ratchet teeth 435 can be constant communication with the ratchet arms 475 by spring bias of the ratchet arms 475. the end cap 430 is rotated, the ratchet teeth 435 pass by the ratchet arms 475 which then, in step-wise fashion, limit advancement of the piston 485. The ratchet teeth 435 and ratchet arms 475 are also configured so that the end cap can only be turned in one direction, for of the piston 485. The engagement teeth 435 and ratchet arms 475 are oriented in such a that they will not allow reverse motion of the end cap FIG. 5 shows a plan view of the advancement mechanism 405 and end cap 430 of FIG. FIG. 5 shows that the end cap 430 includes engagement teeth 435 formed along its lower FIG. 5 also shows that the ratchet head 460 and ratchet arm 465 are fitted into the end cap FIG. 5 further shows the base 470 that includes ratchet arms 475 and notches 490. A stem includes a piston head 485 while the opposing end of the stem 480 extends through a key (not shown) formed in the base 470 and into an opening formed in the ratchet arm 465. opening of the ratchet arm 465 includes threads (like those shown in FIG. 2) that engage with threads of the stem 480. Thus, rotation of the end cap 430 causes the stem 480 to extend move in a linear direction. The ratchet teeth 435 and ratchet arms 475 form a system that to piston 485 to advance in an incremental or step-wise fashion. This prevents a user discharging the paint too quickly and also prevents retraction of the piston 485 toward direction of the end cap 430. As shown in FIG. 5, when the user rotates the end cap 430 in clockwise manner, the ratchet teeth 435 ride along a top surface of the ratchet arms 475 rotation in an incremental manner. The sloped orientation of the ratchet teeth 435 rotation in a counterclockwise direction because the ratchet arms 475 block rotation of ratchet teeth in a counterclockwise FIG. 6 shows the applicator 400 of FIG. 4 with the cover or cap 450 removed so that applicator can be used.

Figure 7:
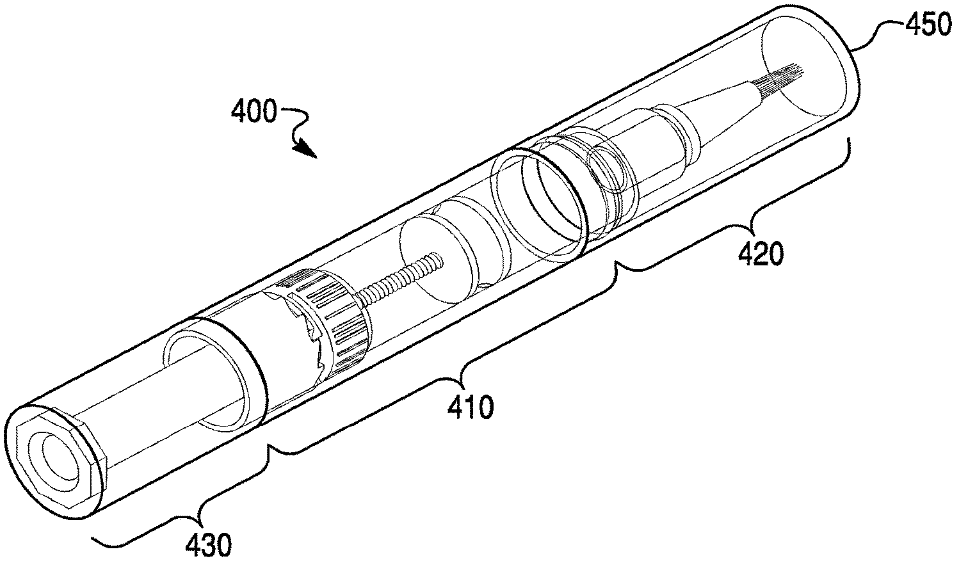
FIG. 7 is a perspective view of the paint applicator of FIG. 4.

FIG. 7 shows the applicator 400 of FIG. 4 with the cover or cap 450 fitted over applicator portion 420 to prevent drying of the tip.

Figure 8:
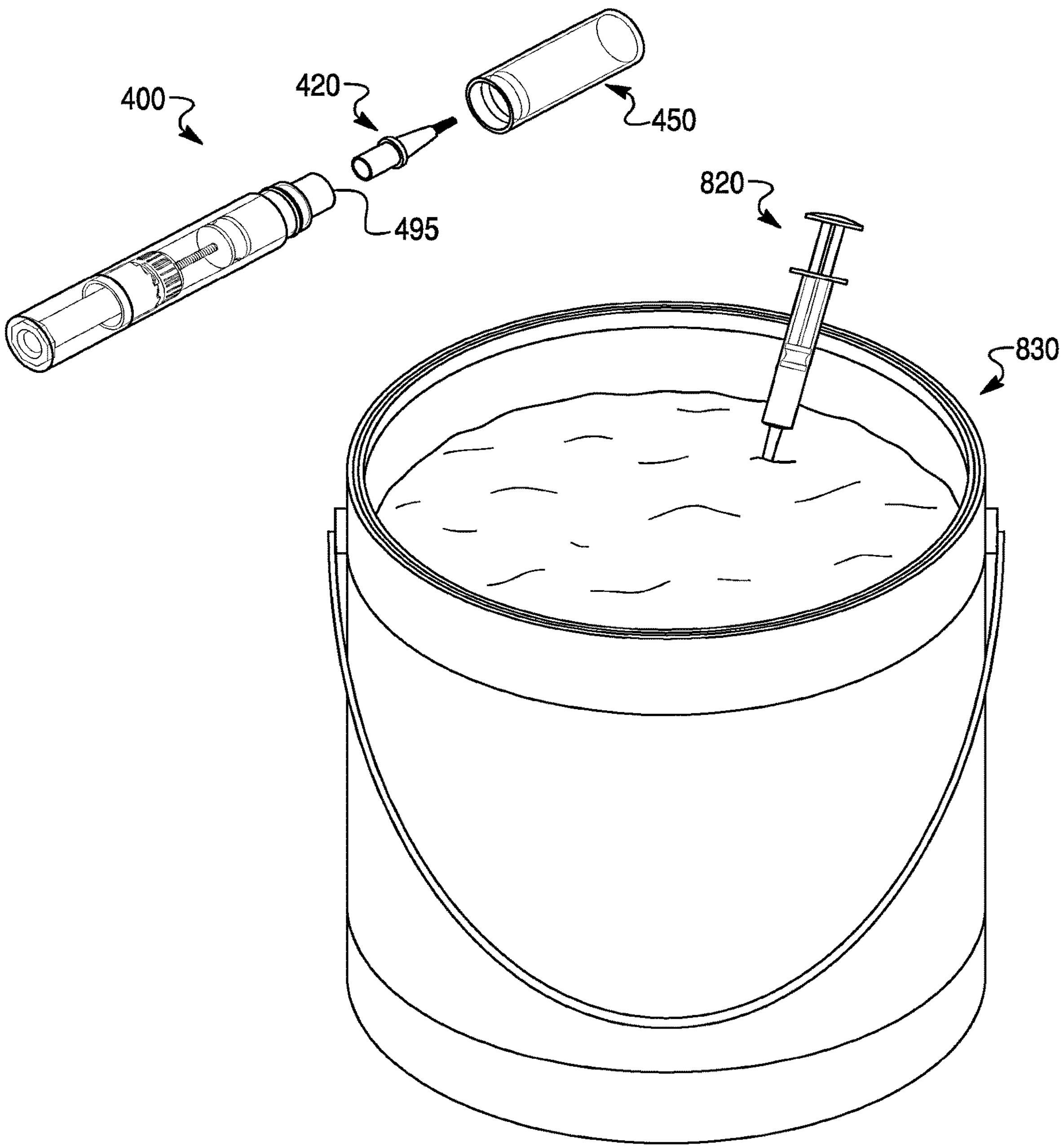
FIG. 8 is an illustration of a paint applicator kit in accordance with principles of disclosed subject matter.

FIG. 8 shows a kit that includes an applicator 400 and a syringe 820 that can be used load the applicator 400 with paint. A user seeking to use the paint applicator 400 will first to load the body of the applicator 400 with paint. As described in connection with FIGS. 1-3, paint applicator 400 may be configured with the applicator portion 420 already attached to main body, or, alternately, with the applicator portion 420 disconnected from the main body. packaging purposes, the applicator portion 420 can be nested to the interior volume of applicator to reduce its size for packaging purposes. In this case, the user can remove applicator portion 120 and fill the applicator body through an opening 495. Thus, the user use a paint transfer structure, such as the syringe 820, to withdraw paint from a paint 830. The user can then dispense the paint from the syringe 820 into the body of the 400 via the opening 495. Once the paint has been dispensed into the body of the applicator, applicator portion 420 can be snap fitted onto the end of the main body of the applicator. paint transfer structure can also be in the form of a cartridge as described above, or a paint tube, or other paint containing structures. In other embodiments, the applicator portion and the end of the main body of the applicator can be equipped with threads that allow the applicator portion 420 to be screwed into the main body of the applicator 400. It is also contemplated that multiple applicator portions 420 can be provided with the device so that a can quickly change out a dry applicator and/or can quickly change color of paint being used the device. Thus, use of the syringe can minimize In another embodiment, a paint cartridge can be loaded into the interior volume of applicator 400. Pre-loaded paint cartridges have the added advantage that the user does not to handle paint. The paint cartridge can be in many various forms, including a sealed plastic that is punctured after insertion into the interior volume 415. Alternatively, plastic cylinders filled with paint could be sold that fit within the interior volume of the applicator and only disperse paint when a force is applied to one or both ends of the plastic Once the interior volume of the applicator is loaded with paint, the user can rotate end cap 430 in order to wet the tip 425. Rotating the end cap 430 causes the end cap 430 engage and rotate the ratchet head 460. Rotation of the ratchet head 460 also causes rotation of the ratchet arm 465 which in turn causes the advancement of the stem 480 in a direction the tip 425. As the stem 480 advances, the piston 485 also advances pushing the paint in direction of the tip 425. The user can continue to turn the end cap 430 until the tip 425 enough paint for the desired use. When the user determines that the tip requires more paint, or she can advance the paint by turning the end cap 430. As described above, the base generally holds the advancement mechanism 405 in place through the engagement of the 490 with the ridges 455. Also, as described above, the ratchet system formed by the ratchet 435 and the ratchet arms 475 limit movement of the piston 485 in one direction and in a incremental fashion. This can prevent a user from discharging the paint too quickly. Once user has completed the project, the user can dispose of the applicator It should be understood that various modifications may be made to the embodiments and modifications described above without departing from the spirit and scope of the disclosed subject matter. In particular, each of the structures shown in the modifications and embodiments can be combined and/or exchanged with each other accordance with various aspects and desired applications. In addition, the main cylindrical is shown as having a shape that is circle in cross-section (when viewed along a longitudinal direction). However, different cross-sectional shapes for the main cylindrical body are contemplated as part of the disclosed subject matter, including polygonal, non-symmetrical, other shapes that may be beneficial for a particular application or marketing Furthermore, if the entire length of the cylinder main body 115 has a complimentary or non-symmetrical cross-sectional shape with respect to a shape of the piston, the keyway in base 175 may not be necessary because the piston 185 and stem 180 would be prevented rotation by the complimentary shape of the main cylindrical body It should be understood that the applicator could be made of a variety of materials, limited to plastics and polymers, depending on the nature and reactivity of the paint or Thus, the applicator could be formed from other materials, including but not limited to ceramics, metals, etc.

The apparatus, kit and method can include a plurality of different or identical tips. example, the apparatus or kit can include different sized brushes that can be selectively depending on the surface area, surface type, and size of the application. In addition, types of tips can be included with the apparatus, kit and method to allow for different applications. For example, a brush tip, a ball point tip, a sponge tip, and/or other tip can all included with the applicator so that the user has many different options and styles of use of the applicator.

The method of using the apparatus or kit as disclosed above can include using device in conjunction with stains, furniture stains or polishes in order to touch up statues, paintings or other artwork. The use of the disclosed apparatus and kit in such a allows quick, easy, and clean touch ups that can easily be conducted by the homeowner, agents, interior decorators and others without requiring drop cloths, tapings, and other items typically required when painting or touching up items located within a furnished or finished room.

While there has been described what are at present considered to be embodiments of the present invention, it will be understood that various modifications may be made thereto, and it is intended that the appended claims cover all such modifications as within the true spirit and scope of the invention.

What is claimed is:

1. An applicator kit for applying fluids, including paint, stain, and other colorants, to a surface, the applicator kit comprising:

a syringe and an applicator, the applicator comprising a cylindrical main body having a first end and a second end, the cylindrical main body defining an interior volume configured to receive fluid, the main body made from a material that allows the color of the fluid to be seen, an applicator structure, the applicator structure removably attachable to the first end for fluid communication with the interior volume of the cylindrical main body, the applicator structure including a tip for applying fluid from the interior volume to a surface, an advancement mechanism disposed in the second end of the main body for advancing fluid from the interior volume to the applicator structure, the advancement mechanism including an advancement arm and a piston with a threaded piston rod, the advancement arm including threads for engaging the threaded piston rod, and a movable end cap disposed adjacent the second end of the cylindrical main body, the movable end cap operably engaged with the advancement arm, the movable end cap rotatable for advancing linearly the piston into the interior volume for causing fluid to be communicated to the applicator structure;

the syringe sized and adapted for suppling fluid from the syringe to the interior volume when the applicator structure is detached from the main body.

2. The applicator kit of claim 1, wherein the applicator structure is a plastic cylinder, and the tip includes a brush located at the distal end of the cylinder.

3. The applicator kit of claim 1, wherein the end cap includes an interior keyway surface that mates with an exterior surface of the advancement arm of the advancement mechanism so that when the end cap is rotated the advancement arm also rotates.

4. The applicator kit of claim 1, wherein rotation of the end cap causes the piston rod and piston to move within and respect to the cylindrical main body so that the interior volume of the cylindrical main body is reduced causing fluid to exit the interior volume via the applicator structure.

5. The applicator kit of claim 1, further comprising a plurality of applicator structures such that a user can easily change applicator structures.

6. The applicator kit of claim 1, wherein the applicator structure is adapted to be snap fit into the main body.

7. The applicator kit of claim 1, wherein the syringe has a piston, piston rod, and piston cylinder body, the syringe configured to withdraw fluid from a fluid reservoir via movement of the piston and piston rod with respect to the piston cylinder, and to distribute fluid to the interior volume by reverse movement of the piston and piston rod with respect to the piston cylinder.

8. An applicator kit for applying fluids, including paint, stain, and other colorants, to a surface, the applicator kit comprising:

a syringe and an applicator, the applicator comprising a plastic main body made from a material that allows the color of fluid therein to be seen and having a first end and a second end, the main body defining an interior volume configured to receive the fluid, an applicator structure removably attachable to the first end for fluid communication with the interior volume, the applicator structure including a tip for applying fluid from the interior volume to a surface, an advancement mechanism including a plunger disposed in the second end of the main body for advancing fluid from the interior volume to the applicator structure, and a movable end cap disposed adjacent the second end of the cylindrical main body, the movable end cap operably engaged with the plunger, the movable end cap rotatable for advancing linearly the plunger into the interior volume for causing fluid to be communicated to the applicator structure;

the syringe sized and adapted for supplying fluid from the syringe to the interior volume when the applicator structure is detached from the main body.

9. The applicator kit of claim 8, wherein the tip includes a brush located at the distal end of the main body.

10. The applicator kit of claim 8, wherein the end cap includes an interior keyway surface that mates with an exterior surface of the advancement mechanism so that when the end cap is rotated an advancement arm also rotates in order to advance the plunger.

11. The applicator kit of claim 10, wherein rotation of the end cap causes a piston rod and piston to move within and respect to the main body so that the interior volume of the main body is reduced for causing fluid to exit the interior volume via the applicator structure.

12. The applicator kit of claim 8, further comprising a plurality of applicator structures such that a user can easily change applicator structures.

13. The applicator kit of claim 8, wherein the applicator structure is adapted to be snap fit into the main body.

14. The applicator kit of claim 8, wherein the syringe has a piston, piston rod, and piston cylinder body, the syringe configured to withdraw fluid from a fluid reservoir via movement of the piston and piston rod with respect to the piston cylinder, and to distribute fluid to the interior volume by reverse movement of the piston and piston rod with respect to the piston cylinder.

15. An applicator kit for applying fluids, including paint, stain, and other colorants, to a surface, the applicator kit comprising:

a syringe and an applicator, the applicator comprising a main body made from a material that allows the color of fluid therein to be seen and having a first end and a second end, the main body defining an interior volume configured to receive fluid, an applicator structure removably attached to the first end for fluid communication with the interior volume, the applicator structure including a tip for applying fluid from the interior volume to a surface, an advancement mechanism including a plunger disposed in the second end of the main body for advancing fluid from the interior volume to the applicator structure, and a movable end cap disposed adjacent the second end of the cylindrical main body, the movable end cap operably engaged with the plunger, the movable end cap rotatable for advancing linearly the plunger into the interior volume for causing fluid to be communicated to the applicator structure;

the syringe sized and adapted for supplying fluid from the syringe to the interior volume when the applicator structure is detached from the main body.

16. The applicator kit of claim 15, wherein the tip includes a brush located at the distal end of the main body.

17. The applicator kit of claim 15, wherein the end cap includes an interior keyway surface that mates with an exterior surface of the advancement mechanism so that when the end cap is rotated an advancement arm also rotates in order to advance the plunger.

18. The applicator kit of claim 15, wherein rotation of the end cap causes a piston rod and piston to move within and respect to the main body so that the interior volume of the main body is reduced for causing fluid to exit the interior volume via the applicator structure.

19. The applicator kit of claim 15, further comprising a plurality of applicator structures such that a user can easily change applicator structures and the applicator structure is adapted to be snap fit into the main body.

20. The applicator kit of claim 15, wherein the syringe has a piston, piston rod, and piston cylinder body, the syringe configured to withdraw fluid from a fluid reservoir via movement of the piston and piston rod with respect to the piston cylinder, and to distribute fluid to the interior volume by reverse movement of the piston and piston rod with respect to the piston cylinder.

* * * * *